United States Patent [19]

Martin, Jr.

[11] 3,922,601
[45] Nov. 25, 1975

[54] SPIRAL PLATE YARN MEASURING CAPACITANCE CELL

[75] Inventor: James H. Martin, Jr., Waynesboro, Va.

[73] Assignee: E. I. Du Pont de Nemours & Co., Wilmington, Del.

[22] Filed: Mar. 1, 1974

[21] Appl. No.: 447,254

[52] U.S. Cl. ............... 324/61 R; 317/246; 317/252; 324/61 P; 324/DIG. 1
[51] Int. Cl.² ......................................... G01R 27/26
[58] Field of Search .......... 324/61 P, 61 R, DIG. 1; 317/252, 246

[56] References Cited
UNITED STATES PATENTS

| | | |
|---|---|---|
| 2,802,975 | 8/1957 | Weber, Jr. ................ 324/61 P |
| 2,950,436 | 8/1960 | Butticaz et al. ........... 324/61 R |
| 3,002,104 | 9/1961 | Mynall ..................... 317/252 X |
| 3,009,101 | 11/1961 | Locher ..................... 324/61 P |
| 3,122,956 | 3/1964 | Jucker ..................... 324/61 R X |
| 3,185,924 | 5/1965 | Locher ..................... 324/61 R |
| 3,221,171 | 11/1965 | Locher ..................... 324/61 R |
| 3,371,568 | 3/1968 | Felix ....................... 324/61 R X |
| 3,566,221 | 2/1971 | Sargent .................... 317/246 |

*Primary Examiner*—Stanley T. Krawczewicz

[57] ABSTRACT

A yarn measuring capacitor having substantially equidimensional helicoid electrical conducting strips insulated from each other and located coaxially of a moving yarn. The preferred embodiments do not require a free end of yarn for stringups.

13 Claims, 11 Drawing Figures

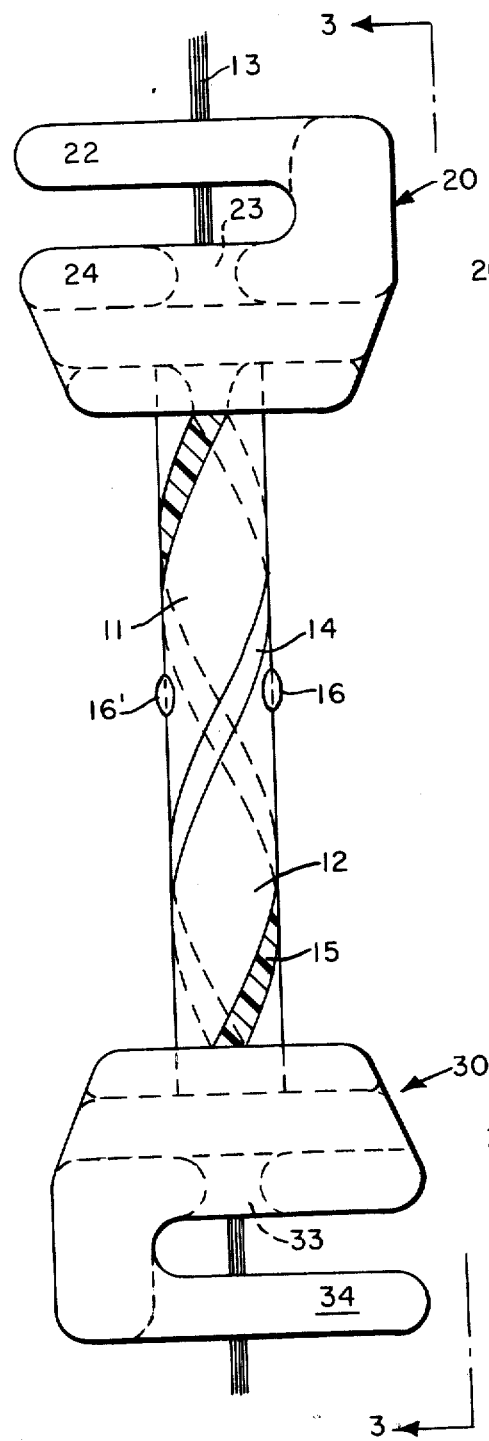
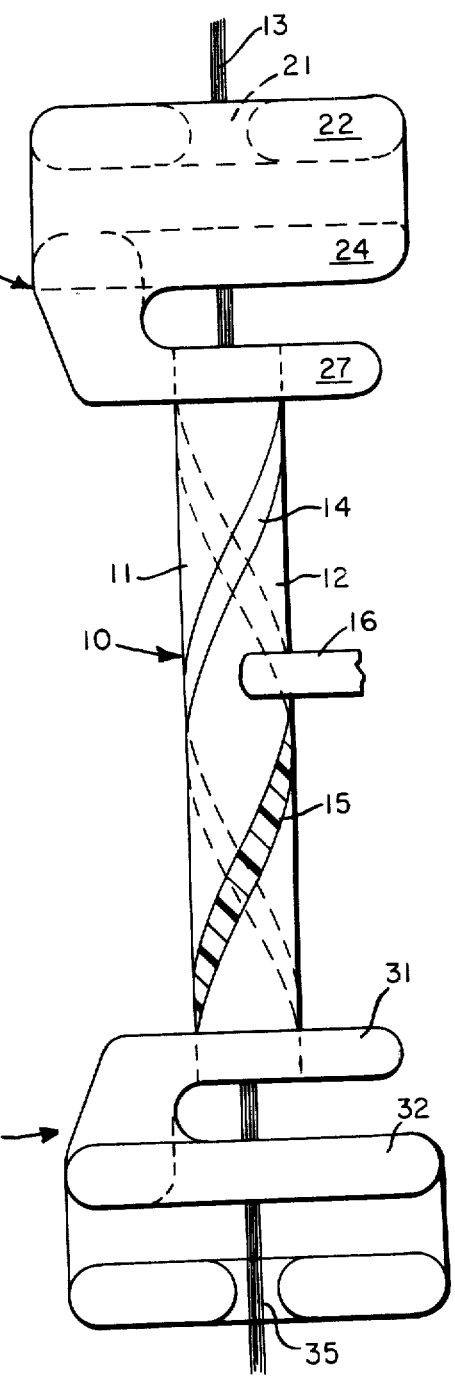

SPIRAL PLATE YARN MEASURING CAPACITANCE CELL

BACKGROUND OF THE INVENTION

This invention relates to an improved apparatus for measuring variations continuously along the length of an elongate article made of dielectric material More particularly, it concerns an instrument for measuring yarn denier that employs a capacitance cell through which the yarn passes.

Several types of instruments are taught in the art. Some instruments employ mechanical techniques and others employ shadowgraph principles with electro-optical detection techniques. Many employ a parallel flat plate air capacitor through which the material is continuously guided. This latter type of denier measuring apparatus detects changes in capacitance as yarn is drawn through the capacitor and relate these changes to changes in mass per unit length of the material.

Although prior devices provide valuable measurements in many cases, such as for gross variations in denier or for characterizing yarn of large average denier, these devices do not properly compensate for changes in yarn cross-sectional shape or for transverse vibrations of the yarn as it passes through the measuring capacitor cell. The resulting lack of measurement accuracy for prior devices has rendered them unsatisfactory for screening yarns for small denier changes of magnitude such as about 20–25% or less. Furthermore, prior devices frequently give false indications of change in denier when the change is (1) merely a flattening of yarn cross-sectional shape and/or (2) "noise" in the measurement signal due to yarn vibrations.

SUMMARY OF THE INVENTION

The above disadvantages have been largely overcome in an apparatus for continuously measuring variations along the length of a moving elongate dielectric material, said apparatus comprising spaced guide means for defining a path for said moving elongate dielectric material; a capacitance cell through which said material passes coaxially for distributing an electric field in a multiplicity of directions around said material within said capacitance cell; and circuit means connected to said capacitance cell for providing said field and for measuring said variations along the length of said material passing through said capacitance cell.

In the preferred embodiment, the capacitance cell comprises a capacitor whose plates are composed of two elongate helicoid conducting strips insulated from one another; each strip coaxial with the path of the thread to be measured so that the strips form a spiral or static helicoidal structure with each strip preferably making at least about one turn around the threadline. For each point on one strip, there is a corresponding point on the other strip which is diametrically across the threadline and has the same curvature. The two strips form together a cylindrical surface structure except for the spiral spaces between the strips. In the preferred embodiment of this invention, one of these spiral spaces is left open to form a spiral slot for use in yarn stringup. The other slot is filled with an insulating material such as epoxy resin.

A double set of stacked thread guides, one at each end of the capacitance cell, comprised of a first pair of button guides located adjacent the entrance end of the cell, and a second pair adjacent the cell exit serve as guide means for defining a path through the cell. Each button has a guiding slit, with finished surface, extending inward from the periphery to a distance beyond the button center which is at least the width of the slit. The second button of each pair has the center line of its guide slit rotated about 90° about the thread direction from the center line of the slit of the first button. When, as in the preferred embodiment, an open spiral stringup slot is provided in the capacitance cell, the slits of the button guides are oriented relative to the spiral slot in such a way as to facilitate stringup. In addition, the assembly of the stacked thread guides and spiral cell is supported to enable passage of a stringup tool such as a sucker gun tip, completely around the assembly during the process of stringing the yarn through the spiral slot, into the cell and through the guides.

BRIEF DESCRIPTION OF THE DRAWINGS

FIG. 2 is a front elevation of another embodiment of a stacked guide and compensated capacitance cell assembly;

FIG. 3 is a right side elevation of the assembly looking in the direction of 3—3 on FIG. 2;

FIG. 9 is a similar sketch for a fully compensated cell with about 180° nominal threading-in;

FIG. 10 is a similar sketch for a fully compensated cell with about 120° nominal threading-in; and FIG. 11 is a similar sketch for a partially compensated cell with about 240° nominal threading-in.

DESCRIPTION OF THE PREFERRED EMBODIMENT

The first embodiment of the compensated measuring cell for yarn denier determinations exemplifies one of many structures that the invention may take depending on the type of material to be characterized and on the environment into which the instrument measuring cell must fit such as limited space often encountered in multiple threadline, narrow gage, yarn production machines. This first embodiment is applicable particularly for comparatively fine yarn (for example, 20, 40, 70 denier) and spinning machine threadline spacings which limit the major cell envelope to a space of the order of 1 cm. wide by 3 cm. high. Thus, the helicoidal configuration of the capacitor cell for obtaining compensation is particularly useful for this confined space since it obtains compensation in a compact structure.

Figure 1:
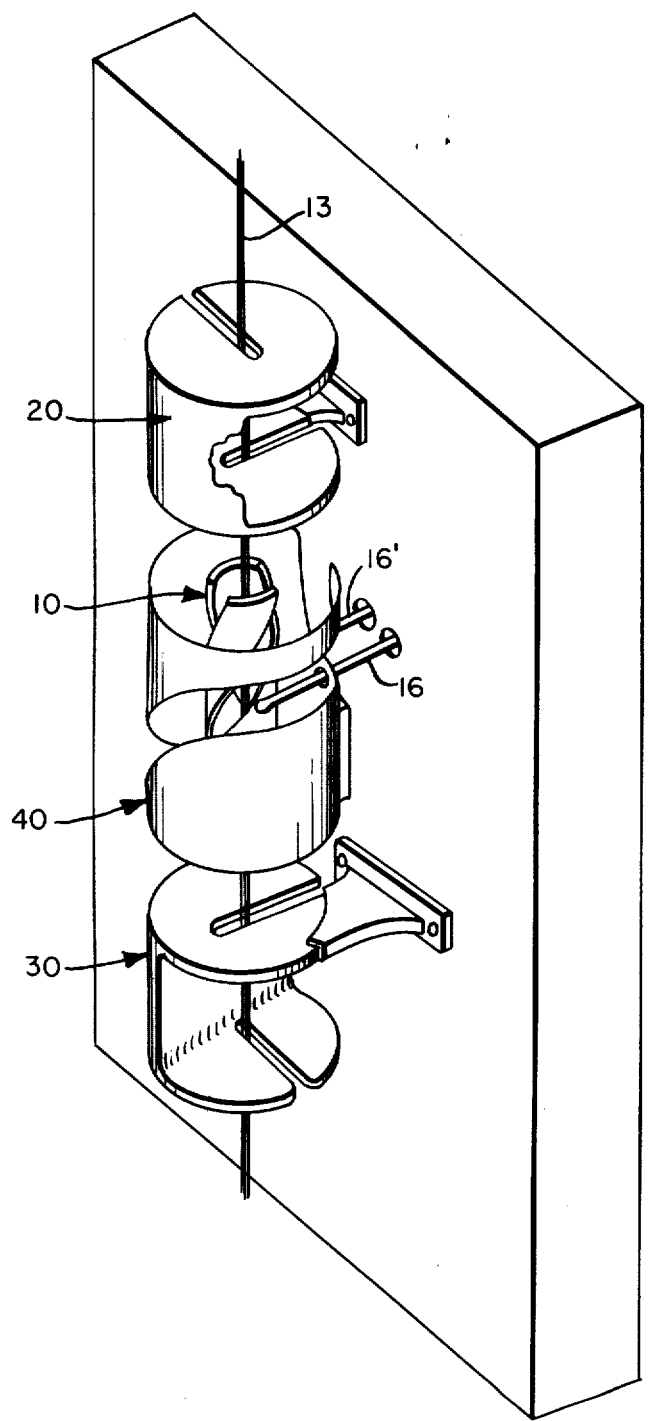
FIG. 1 is a perspective view of one embodiment of the apparatus of this invention.

Turning first to FIGS. 1–6, the invention is shown to comprise a helicoidal compensated capacitor measuring cell 10 with two pairs of stacked threadguides 20, 30. In some cases, it is preferred to mount the measuring cell 10 and the stacked guides 20, 30 slightly spaced from each other and separately supported from a mounting block such as illustrated in FIG. 1. In other cases, the guides 20, 30 may be attached to either end of the cell 10 as illustrated in FIGS. 2 and 3. This device is typically used in a yarn spinning machine where a yarn 13 axially coincident with centerline of the cell 10 is furnished from a source not shown and passed vertically downward through the upper stacked guide 20, through the center of cell 10 and out through the lower stacked guide 30 to a windup or further processing apparatus not shown. In some cases, the yarn motion may be reversed. The device is arranged and connected electrically to a circuit for analyzing changes in yarn denier as shown in FIG. 7.

Returning to FIGS. 1–6, cell 10 is seen to comprise two elongate coiled equidimensional conducting strips 11, 12. (These strips are more specifically illustrated by FIG. 5.) Coiled strips 11, 12 are illustrated as cooperating parallel helical shapes in the form of a double helix of the same hand and coaxial with the path of yarn 13 when it is passed through the device. Strips 11, 12 are so constructed to be of about the same pitch and diameter and arranged to provide spiral slots 14, 15 between them. Slot 14 is left open to provide a stringup passage into the center of cell 10 from the outside. Slot 15, on the other hand, is filled with an insulating material such as an epoxy to a depth approximately equal to the thickness of the strips 11, 12 so that a smooth cylindrical yarn path is enclosed by strips 11, 12 except for open slot 14 (FIGS. 2, 3). Additional insulating material may be thinly coated on the inner surface of this enclosure in order to restrict the yarn from too closely approaching or touching the capacitor plates (strips 11, 12). Two conducting support arms 16, 16' are fastened respectively to strips 11, 12. Arms 16, 16' provide not only partial support for cell 10 but also provide the electrical connections to the two strips which form the helical plate capacitor.

Figure 4:
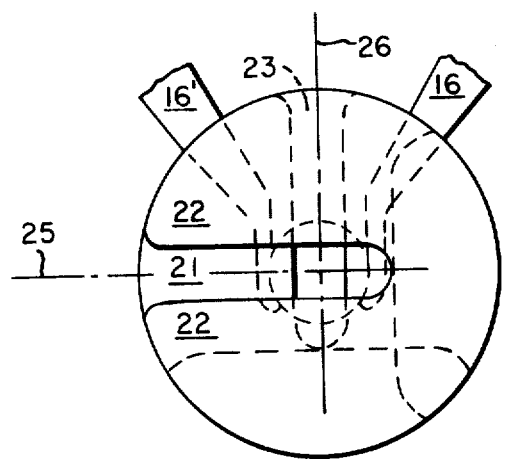
FIG. 4 is a plan view of the assembly of FIG. 2.
Figure 5:
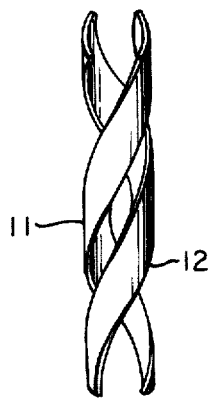
FIG. 5 is an isometric sketch of the two helicoid conducting strips removed from the compensated cell.

As evident from FIGS. 2–4, the upper and lower pairs of stacked threadguides 20, 30 are very similar except for minor structural differences and their orientation relative to cell 10. In this embodiment, stacked guide 20 comprises an upper button guide 22 having cut therein a guiding slit 21 and fastened thereto a lower button guide 24 which in turn has a guiding slit 23. The center line 25 of slit 21 is seen in FIG. 4 to be rotated approximately 90° from the center line 26 of slit 23, in a right hand direction of rotation around the threadline path 13 of the measuring apparatus. By this orientation of guiding slits, the threadline is restrained from riding in the bottom of either slit. A mounting arm 27 is appended to the stacked guide 20 in order to provide for attaching the upper end of cell 10 thereto, through an appropriate bore. The lower stacked guide arrangement 30 is seen to comprise a mounting arm 31 with the bore therein for attaching the guide to the lower end of cell 10 and an upper button 32 having cut therein a guiding slit 33 along with a lower button 34 with its associated guiding slit 35. Here again, the center lines of slits 33 and 35 are oriented at 90° rotation from each other. Slit 23 of the upper stacked guide 20 is favorably aligned with the upper end of open slot 14 and slit 33 of lower stacked guide 20 is oriented to be in similar alignment with the bottom end of slot 14. These stacked guides are made from typical guide materials such as Alsimag 698 or 614 and the outside of the lower guide 30 is rounded and finished on all exteriors surfaces since the yarn during stringup will frequently have to be passed across the outside of the lower guide. The two capacitor lead arms 16, 16' are oriented relative to the slits 23, 21, 33, 35 and slot 14 such that a yarn being passed into a stringup device such as a sucker gun can be introduced into slit 21 first then slit 23, down into the upper end of slot 14, passed around cell 10 so that the yarn slips through slot 14, and then finally through slit 33 and 34 so that the yarn then passes directly through the center of the assembly.

Figure 6:
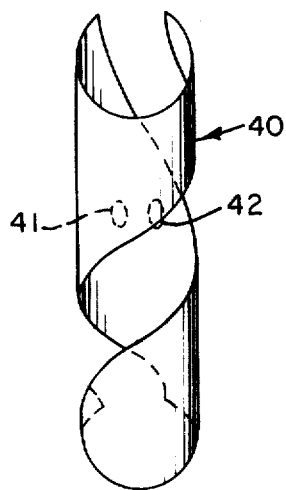
FIG. 6 is an isometric sketch of an optional shield.
Figure 7:
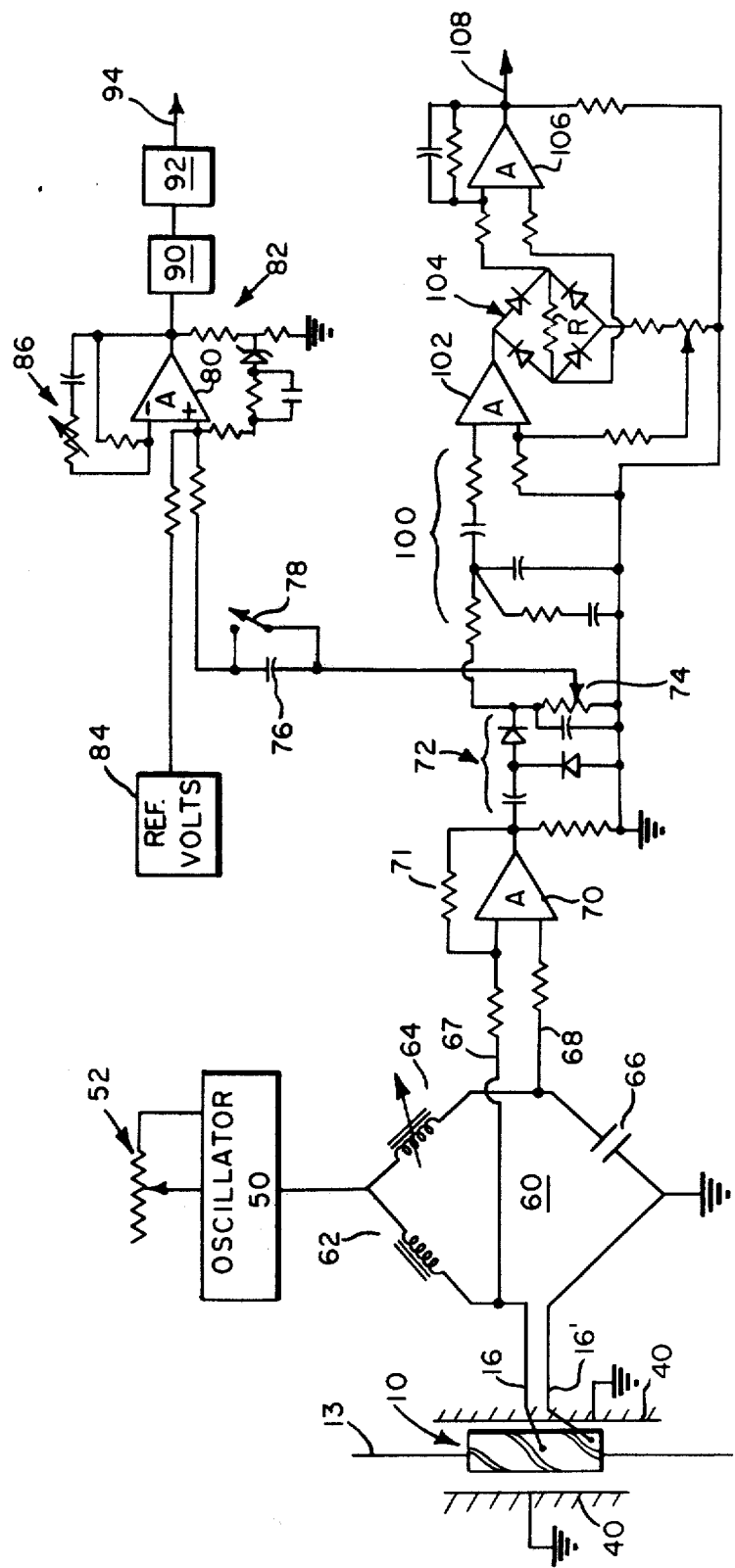
FIG. 7 is a circuit diagram for a typical circuit in which the compensated capacitance cell is used to monitor denier changes.

As a refinement a metallic grounded plate 40, as shown in FIG. 6, is arranged to partially enclose cell 10 and to leave stringup slot 14 available throughout its length. A lead wire or metallic support not shown extends from shield 40 to an electrical ground. Holes 41, 42 are provided for passage of lead arms 16, 16'.

The compensated capacitor measuring cell of this invention may be used to measure yarn denier when coupled with any of the many known electronic circuit arrangements wherein a capacitance cell is used as the detecting element through which the yarn is passed.

FIG. 7 shows a circuit designed to the specific double purpose of monitoring yarn first for short length rapid denier increases sometimes called defect events or blips, and second for average percentage denier variability.

This circuit is seen to comprise first an oscillator 50 having an oscillator amplitude control 52 to regulate its output. Oscillator 50 in turn is connected across one diagonal of bridge subcircuit 60. The arms of bridge 60 contain a fixed inductor 62, a second, variable, inductor 64, a capacitor 66 and the capacitor of measuring cell 10, respectively. A pair of leads 67, 68 are connected from the opposite diagonal points of bridge 60 through resistors to an operational amplifier 70 which has a feedback resistor 71 across an input and output terminal. Amplifier 70 and the other operational amplifiers to be discussed are typically Fairchild $\mu$A741, $\mu$A747 or a similar function, higher frequency equivalent. The output of amplifier 70 is fed through a demodulater circuit 72, the output of which is fed two ways. In the first place the signal is fed through potentiometer 74, the wiper of which is led through a capacitor 76 to a second operational amplifier 80 through a resistor in a conventional manner. Capacitor 76 furnishes high pass coupling which can be shortened out by means of switch 78 in the event that direct analog coupling from scaling potentiometer 74 to amplifier 80 is desired for conditions such as start-up of a spinning process where absolute denier values are useful in detecting filaments separations, etc. Amplifier 80 forms part of a comparator circuit 82 of typical design structure. Thus, a reference voltage 84 is impressed also on the input terminal of amplifier 80 in order to set the level of signal from potentiometer 74 at which amplifier 80 will fire and, therefore, the level of absolute denier or percentage denier defect to be detected. Feedback circuit 86 comprising a capacitor, potentiometer and resistor as shown is provided in order to enable setting the minimum defect length to be detected. Output of comparator circuit 82 in the form of pulses is fed through a pulse shaper circuit 90 and thence through an isolation coupler 92 such as an LED coupled optically to a photo-thyristor. The output of this branch circuit is fed to a signal monitor, recorder, alarm, etc.

The second branch circuit extending from the demodulator 72 comprises first a high and low pass filter 100 the output of which is connected to an operational amplifier 102 containing the diode bridge 104 in its feedback circuit. Bridge load resistor R captures a single polarity, average denier variation signal representative of yarn variability for a cut length established by filter 100 and yarn speed. This signal is amplified and averaged for a multiplicity of cut lengths by amplifier 106. The output of this circuit extends over output line 108 to one or more readout devices such as a recorder or an excess level detector.

The above described preferred embodiment has been found particularly useful in monitoring the production of elastomeric yarns where, first, particularly restrictive space limitations must be met in order for the detecting cell to fit in multiple on a yarn production machine and, secondly, wherein it is particularly important to minimize intermittent friction plucks on yarn near the measuring zone which for elastomeric yarns would produce unusually high denier changes of false nature.

This embodiment achieves what is called full compensation in that it essentially eliminates the effects of thread vibration normal to the measuring zone axis (and therefore stretch variations in the yarn direction of motion) and also the effects of cross section shape changes (round to flat, etc.) by means of a capacitance cell that distributes an electric field in a multiplicity of directions simultaneously around the yarn.

Other configurations to achieve full compensation are possible and must follow the following rules relative to the measuring cell capacitor plate construction: (1) both capacitor plate surfaces must be concentric about the measuring zone axis and, therefore, the threadline; (2) every point on the area of one plate must have an equivalent inverse point across the measuring zone axis and must be of the same magnitude of curvature; and (3) both capacitor plates must be equal in length within the measuring zone along all lines within the plates parallel to the measuring zone axis.

Other embodiments of fully compensated measuring cells are possible within the scope of this invention. For example, arrays of flat or curved plates which are excited by multiphase sensing voltage would, in effect, cause the electrical field to rotate about the threadline and thus compensate for vibration and yarn flatness.

In addition, further embodiments are possible wherein it is acceptable to use partial compensation such as, for example, when precision requirements for either the measuring of short length defects or of long range changes in denier are not as demanding. For example, the capacitance cell may comprise a multiplicity of flat plate capacitors with each successive set of plates displaced angularly about the thread-line direction of motion with proper electrical connection to give partial compensation for vibration and yarn cross-sectional shape variations. The most simple embodiment of this would be two adjacent flat plate capacitors with electrical connections reversed between the plates of adjacent capacitors.

Even though it is advantageous in many respects to provide a stringup slot for ease in starting the threadline through the measuring zone or cell, it is obvious that a closed cell can be used with the slight disadvantage that the cell must be threaded either by suction or by mechanically threading a cut end through the cell.

Figure 8:
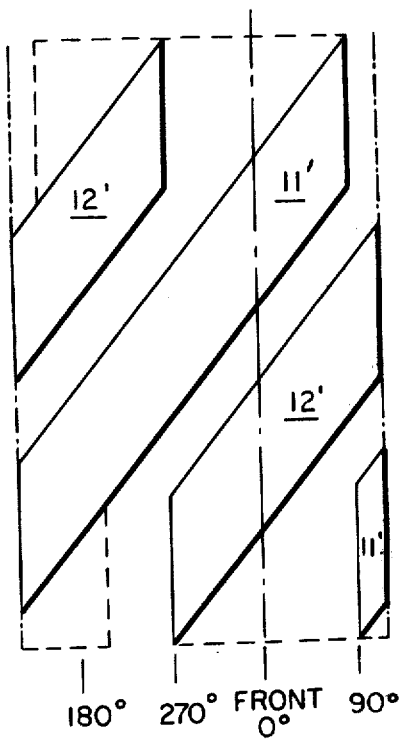
FIG. 8 is a planar development sketch of the surface of a fully compensated cell with about 240° nominal threading-in angle.
Figure 9:
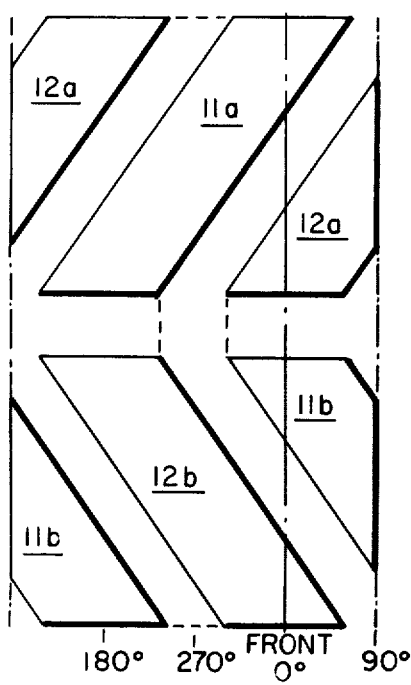
Figure 10:
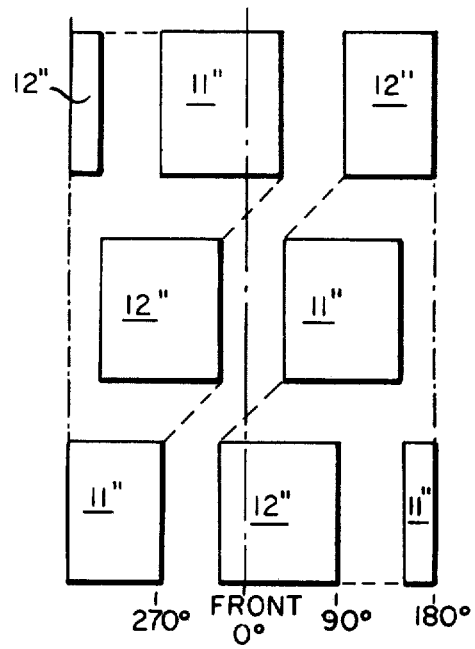
Figure 11:
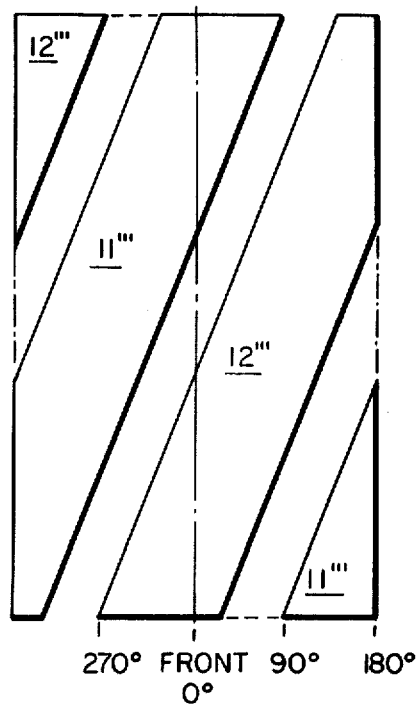

Although the helicoidal capacitance measuring cell of the preferred embodiment has been found particularly useful because of its full compensation for yarn vibration and aspect ratio (out-of-roundness) variation, it does require the inconvenience of a full 360° thread-in motion. It is possible to reduce the required angular motion for thread-in and either lose sensitivity because of reduced capacitor plate area while maintaining a fully compensated cell or maintain full capacitor plate area and lose some of the compensation effect if, in each case, the same cell length and diameter values are maintained. FIG. 8 is the development of the surface of a fully compensated capacitance cell wherein the threading-in wrap of helicoid strips 11', 12' has been reduced from 360° to 240° nominal at the expense of capacitor plate area reduction to about 75% of the area provided in a fully compensated 360° threading-in angle. FIG. 9 is a development sketch for a fully compensated capacitance cell with the threading-in wrap reduced to about 180° nominal. Here, there are two pairs 11a, 12a and 11b, 12b of helicoid strips each making less than one turn around the yarn path and each pair being inversely coiled with respect to the other. FIG. 10 shows the development for a fully compensated capacitance measuring cell with about a 120° nominal thread-in-angle comprised of a stacked array of similar curved plates 11'', 12'' arranged to surround the threadline path. Finally, FIG. 11 is a development sketch of the surface of a partially compensated capacitance measuring cell for which the threading-in angle of helicoid strips 11''', 12''' is reduced to about 240° nominal. In this design capacitance plate area is enhanced at the expense of compensation.

Tests of varied spiral capacitor cell configurations have shown that false denier variation signal compensation is closely proportional to degrees of spiral plate wrap, e.g., 120° wrap gave ⅓ compensation, 180° gave ½ compensation, etc. Thus, there is some loss in noise reduction in the denier analog signal as compared to the fully compensated measuring cell signals. However, the noise is reduced to an adequate degree by this partial compensation for many applications of this type of deniering instrument. In many cases, therefore, design compromise may be made in order to provide greater ease of fabrication and stringup or minimum threadline opening or offset for optimum thread-guiding.

Although the preferred embodiment has been disclosed in detail and several design modifications have been taught, other modifications will become evident to one skilled in the art and, therefore, the invention is to be considered restricted only by the scope of the appended claims.

What is claimed is:

1. An apparatus for continuously measuring variations along the length of a moving elongate dielectric material, said apparatus comprising: spaced guide means for defining a path for said moving elongate dielectric material; a capacitance cell through which said material passes coaxially for distributing an electric field in a multiplicity of directions around said material within said capacitance cell, said capacitance cell comprising: two helicoid electrical conducting strips insulated from each other and coaxial with said path, said helicoid strips being fixed with respect to each other and in the form of a cylindrical structure with spiralled slots between said strips; and circuit means connected to said capacitance cell for providing said field and for measuring said variations along the length of said material passing through said capacitance cell.

2. The apparatus as defined in claim 1, said elongate dielectric material being yarn, said variations being changes in mass per unit length of said yarn.

3. The apparatus as defined in claim 1, said strips making at least about one turn around said path.

4. The apparatus as defined in claim 1, there being two pairs of helicoid strips each making less than one turn around said path and each pair being inverse with respect to the other.

5. The apparatus as defined in claim 1, one of said slots being filled with an insulator the other being open.

6. The apparatus as defined in claim 1, said strips being of equal length.

7. The apparatus as defined in claim 1, there being an equivalent area on one strip diametrically opposed from each specific area on the other strip, the equivalent and specific areas having the same magnitude of curvature.

8. The apparatus as defined in claim 1, including a shield surrounding said coiled conducting strips, there being a spiral slot in said shield in alignment with one of the slots defined by said coiled strips.

9. In a yarn handling system including spaced guide means defining a path of advance for said yarn, a measuring capacitor comprising: two helicoid electrical conducting strips insulated from each other and coaxial with said path, said helicoid strips having about the same pitch and diameter and being in the form of a double helix of the same hand.

10. The system of claim 9, said strips being of equal length.

11. The system of claim 10, said strips making at least one turn around said path.

12. The system of claim 10, there being two pairs of helicoid strips each making less than one turn around said strand and each pair being inverse with respect to the other.

13. The system of claim 10, said strips making less than one turn around said strand.

* * * * *